United States Patent [19]

Winslow, Jr. et al.

[11] Patent Number: 4,622,216
[45] Date of Patent: Nov. 11, 1986

[54] TREATMENT OF SODIUM DITHIONITE REACTION MIXTURE

[75] Inventors: Charles E. Winslow, Jr., Norfolk; Joseph L. Bush; Daniel D. Dickens, both of Chesapeake, all of Va.

[73] Assignee: Virginia Chemicals, Inc., Portsmouth, Va.

[21] Appl. No.: 762,839

[22] Filed: Aug. 6, 1985

[51] Int. Cl.$^4$ ............................................. C01B 17/66
[52] U.S. Cl. ..................................................... 423/515
[58] Field of Search ................................. 423/515, 516

[56] References Cited

U.S. PATENT DOCUMENTS 4,388,291  1/1983  Arakawa ........................... 423/515

FOREIGN PATENT DOCUMENTS

| 48-66594 | 12/1973 | Japan | 423/515 |
| 58-91004 | 5/1983 | Japan | 423/515 |
| 58-79805 | 5/1983 | Japan | 423/515 |
| 58-110406 | 7/1983 | Japan | 423/515 |
| 58-110407 | 7/1983 | Japan | 423/515 |

*Primary Examiner*—Gary P. Straub
*Attorney, Agent, or Firm*—Depaoli & O'Brien

[57] ABSTRACT

A method is taught for increasing the yield of anhydrous sodium dithionite by adding an organic compound that is thiosulfate reactive to a batch reactor containing a puddle solution of methanol and fed with formic acid or an alkali formate as a first feed, an aqueous alkali compound as a second feed, an aqueous alkali formate solution as a third feed, and a methanolic $SO_2$ solution as a fourth feed. This organic compound may be added prior to, combined with, or concurrently with one of the four feeds to the reactor. Preferably, it is added concurrently with the third feed and throughout the entire course of the reaction, ending with the beginning of the cooling period. A suitable addition rate is 0.4–0.6 wt. %/minute, preferably 0.5 wt. %/minute. All of the organic compound is consumed, and at least a portion of the thiosulfate ion is destroyed. The organic compound is selected from the group consisting of epoxy compounds having the formula

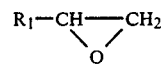

or halogenated hydrocarbons having the general formula $R_2X$ or $XR_2X$, $R_1$ being hydrogen, an alkyl group containing from 1 to 8 carbon atoms, a halogenated alkyl group containing from 1 to 2 carbon atoms, a phenyl group, or a substituted phenyl group. The compound represented by this formula includes ethylene oxide, propylene oxide, butylene oxide, epichlorohydrin, epibromohydrin, and styrene oxide. $R_2$ is a primary or secondary alkyl group containing from 1 to 8 carbon atoms, an allyl group or a 2-methylallyl or 2-ethylallyl group, and X is a halogen atom. Suitable compounds include methyl iodide and allyl chloride.

7 Claims, No Drawings

TREATMENT OF SODIUM DITHIONITE REACTION MIXTURE

BACKGROUND OF THE INVENTION

This invention relates to the manufacture of anhydrous alkali dithionites by reacting an alkaline formate, an alkali metal agent, and sulfur dioxide in an alcohol/water solvent. It particularly relates to improving this process by removing troublesome impurities from the reaction mixture while the reaction is occurring.

In the process for the manufacture of alkali metal dithionites from an alkali metal salt of formic acid, an alkali metal hydroxide, carbonate, or bicarbonate, and sulfur dioxide, the pertinent chemistry is believed to be as shown in the following equations, using sodium formate and sodium hydroxide for illustration:

$$2NaOH + 2SO_2 \rightarrow Na_2S_2O_5 + H_2O, \quad (1)$$

$$2HCOONa + 2SO_2 + H_2O \rightarrow 2HCOOH + Na_2S_2O_5, \quad (2)$$

$$2HCOOH + 2Na_2S_2O_5 \rightarrow 2Na_2S_2O_4 + 2CO_2 + 2H_2O. \quad (3)$$

According to these equations, and assuming that an excess of sodium metabisulfite is present, one mol of sodium dithionite should be produced via Equation (3) for each one mol of formic acid generated as shown in Equation (2).

In practice it is found that substantially less than one mol of sodium dithionite is produced per mol of formic acid. Empirically it has been established that approximately 0.8 mol of sodium dithionite is produced per mol of formic acid.

One reason for this yield deficiency is that formic acid in the alcohol reaction medium used for the process undergoes a certain degree of esterification:

$$HCOOH + CH_3OH \rightleftharpoons HCOOCH_3 + H_2O. \quad (4)$$

The alcohol used for the reaction medium is recovered for re-use via distillation. The methyl formate in the alcohol should be similarly recovered. If the methyl formate recovery were 100% efficient, no yield loss would be occasioned by the chemistry of Reaction (4). In practice, however, it has been found that methyl formate losses do occur, owing principally to its very high volatility. Some loss occurs directly from the reactor, as the methyl formate is carried out by the effluent carbon dioxide. Other losses occur in the act of filtering, washing, and blowing the product filter cake. Still more loss is occasioned by the distillation process. The severity of these various losses will be determined by the perfection of the design and operation of the equipment used to carry out each of these functions.

A second source of yield deficiency is chemical decomposition of sodium dithionite after it is made. While several modes of sodium dithionite decomposition are possible, the predominating loss results in the formation of sodium thiosulfate and other unidentified sulfur compounds which are found in the reactor throughout the course of the reaction:

$$2Na_2S_2O_4 \rightarrow Na_2S_2O_3 + Na_2S_2O_5. \quad (5)$$

It has also been found that the sodium thiosulfate forming reaction is auto-catalytic with respect to sodium thiosulfate. That is, as the concentration of sodium thiosulfate increases in the reactor, its rate of formation similarly increases. This increasing rate of formation may be owing to thiosulfate itself or to the accompanying sulfur compounds. A number of factors are known to influence the rate of sodium thiosulfate formation, principally the reaction temperature, the pH, and the water-to-alcohol ratio in the reaction medium. Despite all efforts to optimize these various conditions and minimize the loss of sodium dithionite, this loss continues to be a principal cost in the manufacture of sodium dithionite.

Japanese Patent Publication No. 28,397/75 teaches a process for manufacturing anhydrous sodium dithionite in an alcohol/water solvent from sodium formate, an alkali compound, and sulfur dioxide, followed by filtering the sodium dithionite crystals from the mother liquor. The publication discloses a method for recycling the reaction filtrate with reduced distillation of the filtrate by treating the filtrate with 1-to-4-fold excess on a molar basis of ethylene oxide, propylene oxide, or a mixture thereof over the amount of sodium thiosulfate contained in the reaction filtrate and by allowing the reaction mixture to stand for several hours at room temperature. The reaction filtrate is combined with the methanol used in washing the separated crystals of sodium dithionite to form a mixture of which a part is distilled to recover the methanol and isolate the addition product, which is discarded, of sodium thiosulfate and ethylene oxide or propylene oxide. This is hereinafter referred to as the filtrate purification/recycle method.

Japanese Patent Disclosure No. 110,407/83 teaches a method for producing dithionites by reacting a formic acid compound, an alkali compound, and sulfur dioxide in a water-organic solvent mixture and by adding an epoxy compound, a halogenated hydrocarbon of the general formula R-X, or a mixture of two or more compounds of these types to the reaction mixture in the final stage of the reaction. Suitable epoxy compounds include ethylene oxide, propylene oxide, butylene oxide, isobutylene oxide, styrene oxide, cyclohexene oxide, epichlorohydrin, and epibromohydrin. In the halogenated hydrocarbon, R is a primary or secondary alkyl group having 1–8 carbons, an allyl group, a 2-methylallyl group, or a 2-ethylallyl group, and X is a halogen. The filtrate obtained by isolating the dithionite crystals, the organic solvent used for washing the crystals, or a mixture thereof is recycled and reused in the reaction.

The reaction is conducted according to Patent Disclosure No. 110,407/83 by dissolving sodium formate in hot water, adding methanol, and heating at 82° C. under an applied pressure of 1.0 kg/cm² gauge while stirring in a reactor equipped with a reflux condenser and a deep-cooling condenser. Subsequently, 50% sodium hydroxide solution and a methanolic solution containing methyl formate and sulfur dioxide are added simultaneously and dropwise over a 90-minute period. Stirring is continued for an additional 150 minutes at the same temperature and pressure. Cooling to 73° over a period of 20 minutes is then started, and simultaneously the epoxy compound, the halogenated hydrocarbon, or a mixture thereof is added within less than five minutes. The dithionite crystals are separated out by filtration under applied pressure with carbon dioxide and subsequently washed with methanol and then dried under reduced pressure. Both the filtrate and the washing liquid were demonstrated to be equivalent to distilled methanol as the organic solvent for producing sodium dithionite. This is referred to hereinafter as the mother liquor cooling/purification method.

In European Patent Publication No. 68,248 and in U.S. Pat. No. 4,388,291, a process is disclosed for producing anhydrous dithionites in which the washing liquid discharged from the washing step is sequentially divided into two portions, a first discharge liquid and a second discharge liquid, the former being treated to convert undesirable substances inhibiting the production of dithionites into substances which do not exert an adverse influence on the production of dithionites by adding an organic compound selected from the group consisting of compounds represented by Formulas I and II and cyclohexene oxide. Formula I is as follows:

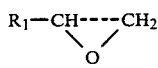

wherein $R_I$ is hydrogen, an alkyl group containing from 1 to 8 carbon atoms, a halogenated alkyl group containing from 1 to 2 carbon atoms, a phenyl group, or a substituted phenyl group. The compound represented by this formula includes ethylene oxide, propylene oxide, butylene oxide, epichlorohydrin, epibromohydrin, and styrene oxide. Formula II is as follows:

wherein $R_2$ is a primary or secondary alkyl group containing from 1 to 8 carbon atoms, an allyl group or a 2-methylallyl or 2-ethylallyl group, and X is a halogen atom. Suitable compounds include methyl iodide and allyl chloride.

In the examples, the reaction of the first discharge liquid (48 parts) with the treatment compound (0.07-0.13 parts) occurred at 25°-45° C. for 1-24 hours after filtration at 73° C. A portion of the treated first discharge liquid was mixed with nearly twice as much of the untreated second discharge liquid and used to prepare sodium dithionite after adjusting for the amount of water in the discharge liquid mixture. The resulting purities and yields for the sodium dithionite product were substantially identical to those obtained with pure methanol. This is hereinafter referred to as the washing liquid purification/recycle method.

The use of a thiosulfate-reactive compound for destroying thiosulfate ions in the mother liquor, the reactor filtrate, or the washing liquid before re-use of the methanol therein, as respectively taught in Japanese No. 110,407/83, Japanese No. 28,397/75, and European No. 68,248, enables the initial reaction mixture of the next run to be substantially free of thiosulfate ions, but it does nothing to diminish the formation of thiosulfate ions during the dithionite-forming reaction. The use of such a thiosulfate-reactive compound in the final (i.e., cooling) stage of the formate/SO2 reaction, as taught in Japanese No. 110,407, similarly enables the reaction filtrate or the washing liquid to be utilized for making sodium dithionite at yields and purities equal to results from manufacture with distilled methanol. Again, however, such protection for the next batch provides no help for the current batch.

Accordingly, there is clearly a need for destroying thiosulfate ions as they are being formed within the reaction vessel in order to minimize destruction of the sodium dithionite product. Moreover, if the thiosulfate ions could be at least partially destroyed in the current batch, the treatment needed for the mother liquor during the cooling period, for the filtrate, or for the wash liquid according to prior art methods could also be decreased before each recycle of filtrate and/or wash liquid to the next batch. Similarly, an in situ treatment to diminish the harmful effects of thiosulfate and other deleterious sulfur compounds would allow the use of raw materials containing these contaminants in the manufacture of sodium dithionite.

SUMMARY OF THE INVENTION

It has surprisingly been discovered that the autocatalytic action of sodium thiosulfate and accompanying sulfur compounds can be negated or at least minimized by adding an organic compound to the reactor prior to starting the sodium dithionite producing process so that the sodium thiosulfate is consumed as soon as it is produced.

The organic compound can also be pumped into the reactor throughout the course of the sodium dithionite producing process to obtain a similar effect. Preferably, the organic compound is pumped into the pressurized reactor throughout the course of the entire reaction, beginning when the reactor contents have been heated to about 50° C. and ending wtih the start of the cooling period. The pumping rate is suitably 0.4–0.6 wt. %/minute and preferably about 0.5 wt. %/minute.

These organic compounds that are capable of reacting with or complexing sodium thiosulfate include the epoxy compounds such as ethylene oxide, propylene oxide, butyl and isobutyl oxide, epichlorohydrin, and epibromohydrin. These organic compounds also include halogenated hydrocarbons of the general formula $R_2X$, or $XR_2X$, where $R_2$ is an alkyl group of carbon number 1 to 8, or an allyl, methallyl, or ethallyl group, and X is a halogen. In the case of ethylene oxide, propylene oxide, and the like, the result of the reaction is a Bunte salt:

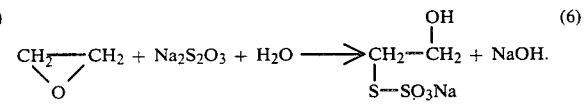

In the case of the alkyl halides, the reaction is:

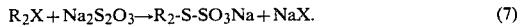

When carrying out repetitive batches on a large scale, it becomes critically important that every detail of the operational procedure be carried out exactly as scheduled. Such an operational procedure is typically developed, after numerous technical studies and operational trials, in unending efforts to maximize product purity and yield. Even small fractional improvements are greatly valued. Accordingly, any destruction of thiosulfate ions and other harmful sulfur compounds during the course of the dithionite-producing reaction that could minimize product losses and increase yield would be an important improvement over known batch production methods.

DESCRIPTION OF PREFERRED EMBODIMENTS

A series of pilot plant experiments was conducted to demonstrate this process. The organic compound was chosen to be propylene oxide owing to its lesser hazard and ease of handling. Ethylene oxide would be the commercial epoxy compound of choice, however, owing to its lower molecular weight and lower cost. The data and calculated results are shown in the Table accompanying Example 9.

EXAMPLE 1

A series of thirteen base line runs was made while adding no propylene oxide to the reactor. These runs were begun by adding to a 100-gallon reactor, as a first feed, 150 lbs of distilled recovered methanol containing 3.67% methyl formate and 0.96% sulfur dioxide. Next, as a second feed, a solution of 7 lbs of 96% sodium formate dissolved in 5 lbs of water was added. The reactor contents were heated to 50° C. with agitation, at which time the third and fourth feeds were started simultaneously. The third feed consisted of 69 lbs of 99% sodium hydroxide, 135 lbs of 96% sodium formate, and 109 lbs of water. Its feed rate was controlled so that it was fed in its entirety in 65 minutes. The fourth feed consisted of 310 lbs of distilled recovered methanol of the same composition as the first feed and containing additional sulfur dioxide of a quantity such that between the first and fourth feeds a total of 201 lbs of sulfur dioxide would enter the reactor. The feed rate of the fourth feed was controlled so that 80% of its total amount was fed to the reactor in 65 minutes.

Owing to the exothermic nature of the reaction between the third and fourth feeds, the contents of the reactor self-heated to 84° C. over a fifteen-minute time period. Temperature control was then initiated to maintain 84° C. throughout the entire remaining course of the reaction. Owing to the evolution of carbon dioxide, the reactor pressure increased to 40 psig in this same 15-minute period. Pressure control was then initiated to maintain 40 psig throughout the entire remaining course of the reaction. The vented carbon dioxide exited the reactor through condensers and a scrubber that was fed with essentially pure recovered methanol at a rate of 0.364 lb per minute. When the third feed was terminated at 65 minutes, the rate of feed of the fourth feed was reduced so that the remaining 20% was fed over an additional 65 minutes. At the conclusion of this feed, an additional 65-minute period at 84° C. and 40 psig was allowed for the reaction to go to completion. The sodium thiosulfate concentration was monitored via sampling the reactor contents at the end of each of the above 65 minute periods. The concentration is expressed as the sodium thiosulfate titer of a standard iodine solution. At the conclusion of this third 65-minute period, the reactor contents were cooled to 73° C. and discharged to the filtering apparatus. After methanol washing, the filter cake was vacuum dried to produce the sodium dithionite product. The thirteen runs made in this manner averaged a titer of 3.9 at the end of the first 65 minute period, 4.3 at the end of the second 65 minute period, and 7.0 at the end of the third 65 minute period. The product averaged 237 lbs in weight at an assay of 91.57%, or a yield of 1.246 mols of sodium dithionite.

EXAMPLE 2

A series of five runs was made by adding 4 lbs of propylene oxide to the first feed. All other quantities and conditions were identical to Example 1 except that the distilled recovered methanol used for feeds one and four contained 3.56% methyl formate. The five runs made in this manner averaged a titer of 1.9 at the end of the first 65 minute period, 2.5 at the end of the second 65 minute period, and 4.6 at the end of the third 65 minute period. The product averaged 245 lbs in weight at an assay of 91.64%, or a yield of 1.289 mols of sodium dithionite.

EXAMPLE 3

A series of five runs was made by adding 6 lbs of propylene oxide to the first feed. All other quantities and conditions were identical to Example 1 except that the distilled recovered methanol used for feeds one and four contained 3.00% methyl formate. The five runs made in this manner averaged a titer of 1.6 at the end of the first 65 minute period, 2.4 at the end of the second 65 minute period, and 4.5 at the end of the third 65 minute period. The product averaged 240 lbs in weight at an assay of 93.35%, or a yield of 1.287 mols of sodium dithionite.

EXAMPLE 4

A series of five runs was made by adding 8 lbs of propylene oxide to the first feed. All other quantities and conditions were identical to Example 1 except that the distilled recovered methanol used for feeds one and four contained 2.71% methyl formate. The five runs made in this manner averaged a titer of 1.5 at the end of the first 65 minute period, 2.3 at the end of the second 65 minute period, and 4.7 at the end of the third 65 minute period. The product averaged 246 lbs in weight at an assay of 91.17%, or a yield of 1.288 mols of sodium dithionite.

EXAMPLE 5

A series of four runs was made by pumping 6 lbs of propylene oxide into the reactor at a rate of 0.031 lb per minute over the 195 minute reaction duration. All other quantities and conditions were identical to Example 1 except that the distilled recovered methanol used for feeds one and four contained 2.58% methyl formate. The four runs made in this manner averaged a titer of 1.5 at the end of the first 65 minte period, 1.3 at the end of the second 65 minute period, and 1.2 at the end of the third 65 minute period. The product averaged 247 lbs in weight at an assay of 90.03%, or a yield of 1.277 mols of sodium dithionite.

It will be noted that according to Equation (6), sodium hydroxide is produced along with the Bunte salt when propylene oxide reacts with sodium thiosulfate. In that sodium hydroxide is a raw material in the production of sodium dithionite, it should be possible to remove a quantity of sodium hydroxide from the third feed.

EXAMPLE 6

A series of six runs was made by pumping 6 lbs of propylene oxide into the reactor at a rate of 0.031 lb/minute over the 195-minute reaction duration. All other quantities and conditions were identical to Example 1 with two exceptions; the distilled recovered methanol used for feeds one and four contained 2.63% methyl formate, and the sodium hydroxide content of the third feed was 66 lbs. The six runs made in this manner averaged a titer of 1.7 at the end of the first 65 minute period, 1.9 at the end of the second 65 minute period, and 1.8 at the end of the third 65 minute period. The product averaged 242 lbs in weight at an assay of 92.63%, or a yield of 1.287 mols of sodium dithionite.

EXAMPLE 7

A series of two runs was made by pumping 10 lbs of propylene oxide into the reactor at a rate of 0.051 lb/minute over the 195-minute reaction duration. All other quantities and conditions were identical to Example 1 with two exceptions; the distilled recovered methanol used for feeds one and four contained 3.00% methyl formate, and the sodium hydroxide content of the third feed was 65 lbs. The two runs made in this manner averaged a titer of 1.5 at the end of the first 65 minute period, 1.9 at the end of the second 65 minute period, and 1.2 at the end of the third 65 minute period. The product averaged 244 lbs in weight at an assay of 92.15%, or a yield of 1.291 mols of sodium dithionite.

EXAMPLE 8

A series of three runs was made by pumping 8 lbs of allyl chloride into the reactor at a rate of 0.041 lb/minute over the 195-minute reaction duration. All other quantities and conditions were identical to Example 1 except that the distilled recovered methanol used for feeds one and four contained 3.00% methyl formate. The three runs made in this manner averaged a titer of 2.0 at the end of the first 65 minute period, 1.3 at the end of the second 65 minute period, and 1.2 at the end of the third 65 minute period. The product averaged 243 lbs in weight at an assay of 92.83%, or a yield of 1.295 mols of sodium dithionite.

EXAMPLE 9

A series of two runs was made by pumping 4 lbs of 1-2 dichloroethane to the reactor at a rate of 0.021 lb/minute over the 195 minute reaction duration. All other quantities and conditions were identical to Example 1 except that the distilled recovered methanol used for feeds one and four contained 3.00% methyl formate. The three runs made in this manner averaged a titer of 3.4 at the end of the first 65 minute period, 5.3 at the end of the second 65 minute period, and 7.8 at the end of the third 65 minute period. The product averaged 237 lbs in weight at an assay of 92.19%, or a yield of 1.255 mols of sodium dithionite.

All of these examples demonstrate an enhanced yield of sodium dithionite achieved by the addition of the named chemical. The results become even more coherent if correction is made to the yield for the variable methyl formate content of the alcohol entering the reactor. According to Equation (4), any deficiency in methyl formate will be made up at the expense of the formic acid needed to produce sodium dithionite via Equation (3). It was established in earlier work that the approach to an equilibrium concentration of methyl formate in one pass through the reactor was only 70%. As was noted earlier, the net efficiency of formic acid utilization in producing sodium dithionite is 80%. Therefore, each one mol deficiency in methyl formate in the methanol entering the reactor will result in a sodium dithionite yield deficiency of 0.56 mol. When this correction (to 3.00% methyl formate) was applied to the reported yields of Examples 1–9, corrected yields were obtained as shown in the Table.

ADDITIONS AND YIELDS FOR REACTION EXAMPLES

| Example No. | Organic Compound Addition | | | Methyl Formate % | Titer Period | | | Yield lb | Assay % | Yield | | |
|---|---|---|---|---|---|---|---|---|---|---|---|---|
| | lbs | wt. % @ | Rate* | | 1st | 2nd | 3rd | | | Reported mol | Corrected mol | Increased % |
| 1 | 0 | 0.0 | 0.0 | 3.67 | 3.9 | 4.3 | 7.0 | 237 | 91.57 | 1.246 | 1.217 | 0.00 |
| 2 | 4 | 1.8 | # | 3.56 | 1.9 | 2.5 | 4.6 | 245 | 91.64 | 1.289 | 1.265 | 3.94 |
| 3 | 6 | 2.7 | # | 3.00 | 1.6 | 2.4 | 4.5 | 240 | 93.35 | 1.287 | 1.287 | 5.75 |
| 4 | 8 | 3.6 | # | 2.71 | 1.5 | 2.3 | 4.7 | 246 | 91.17 | 1.288 | 1.300 | 6.82 |
| 5 | 6 | 2.7 | 0.031 | 2.58 | 1.5 | 1.3 | 1.2 | 247 | 90.03 | 1.277 | 1.295 | 6.41 |
| 6 | 6 | 2.7 | 0.031 | 2.63 | 1.7 | 1.9 | 1.8 | 242 | 92.63 | 1.287 | 1.303 | 7.07 |
| 7 | 10 | 4.5 | 0.051 | 3.00 | 1.5 | 1.9 | 1.2 | 244 | 92.15 | 1.291 | 1.291 | 6.08 |
| 8 | 8 | 3.6 | 0.041 | 3.00 | 2.0 | 1.3 | 1.2 | 243 | 92.83 | 1.295 | 1.295 | 6.41 |
| 9 | 4 | 1.8 | 0.021 | 3.00 | 3.4 | 5.3 | 7.8 | 237 | 92.19 | 1.255 | 1.255 | 3.12 |

All added to puddle (first feed).
*Rate in lbs/min of continuous addition during all three 65-minute periods.
@Of sodium dithionite product.

These corrected yields clearly indicate that the yield increase was proportional to the quantity of propylene oxide added to the reactor up to 8 lbs. At the 10 lbs level, a yield decrease was noted as compared to the identical procedure utilizing 6 lbs of propylene oxide. They also show an improved result when the propylene oxide is pumped in continuously, as opposed to adding it all at the beginning of the reaction, and they show a further improvement when the quantity of sodium hydroxide in the third feed is adjusted to compensate for the sodium hydroxide generated in situ owing to the use of propylene oxide.

"Titer" is a measure of sodium thiosulfate content of the solution at the indicated time and is therefore an indication of the extent of decomposition of dithionite. It is obtained by mixing a 10 ml. sample of reactor filtrate with a neutral formaldehyde solution (to tie up bisulfite), adjusting the pH to 4.0, and then titrating the sample with 0.1 N standard iodine solution.

In the base case Example 1, no organic compound added, the titer affords a measure of the total thiosulfate content of the reaction filtrate but not including the thiosulfate existing as a solid within the product. In Examples 2–9, the titer measures only the thiosulfate in the filtrate that has not reacted or complexed with the organic compound added. No analytical methods are known to determine the quantity of thiosulfate present in the solid product within the reactor or present as a reaction product resulting from the organic compound addition. The titer may or may not indicate the quantity of the various unidentified sulfur compounds present in the filtrate depending on the structure of those compounds.

Because of the shortcomings noted above, a rigorous correlation between the dithionite yield increase achieved and the measured titer would not be expected. However, it can be said that an increased dithionite yield was accompanied by a decrease in the titer measurement, with the magnitude of the decrease being a function of the way in which the organic compound was added to the reactor.

In the previously discussed Japanese patents describing the use of the various organic chemicals to eliminate the sodium thiosulfate in the filtrate, no examples are given for the production of sodium dithionite in the absence of the various organic chemicals. It is not possible, therefore, to demonstrate a yield change owing to the use of these organics. It is assumed, however, that since no yield increase was noted or claimed, that none was observed. To demonstrate this point, the experiments described in Example 10 were performed.

EXAMPLE 10

As a comparative example, a series of four runs was made by adding 6 lbs of propylene oxide to the reactor at the end of the 195-minute reaction period and simultaneously with cooling the reactor contents to 73° C., a process requiring approximately 15 minutes. All other quantities and conditions were identical to Example 1 except that the distilled recovered methanol used for feeds one and four contained 3.00% methyl formate. The four runs made in this manner averaged a titer of 2.9 at the end of the first 65 minute period, 6.8 at the end of the second 65 minute period, and 12.6 at the end of the third 65 minute period. The product averaged 241 lbs in weight at an assay of 88.57% or a yield of 1.226 mols of sodium dithionite.

This yield, 1.226 mols, is a slight improvement (0.74%) as compared to the base line (0 lb propylene oxide) runs of Example 1. The small yield increase is probably owing to a decreased sodium dithionite decomposition during both the slurry cooling period and the filtration and cake wash periods. A filtrate sample taken after the propylene oxide addition resulted in a titer of 2.7.

Example 10 uses the process taught in Japan No. 110,407/83. In both this procedure and in the procedure of Examples 2-9, analysis of the filtrate shows no residual unreacted propylene oxide. That which does not react with the sodium thiosulfate reacts with either water or methanol as shown in the following equations:

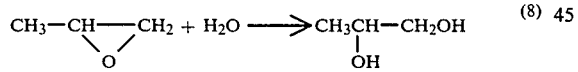  (8)

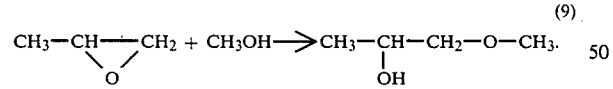  (9)

The products of both of these reactions were found in the filtrate.

EXAMPLE 11

In the process taught in Japan No. 28397/75, the organic chemical was added to the cooled filtrate after the product sodium dithionite was removed. When this procedure was followed, immediate analysis confirmed the presence of the added propylene oxide, 1.1%. After 5 hours, the concentration had decreased to 0.71%, and after 16 hours to 0.62%. Still following the instructions of Japan No. 28397/75, appropriate amounts of both sodium hydroxide and sodium formate were added to the filtrate. A sample then showed 0.45% propylene oxide. When heated to 70° C., again as in Japan No. 28397/75, a sample showed the propylene oxide to be totally consumed, with the same reaction products noted previously in Equations (8) and (9).

The mother liquor purification/cooling method, the filtrate purification/recycle method, and the washing liquid purification/recycle method of the prior art may be classified as the cooling period treatment and filtrate/wash liquid treatment methods of the prior art for destroying thiosulfate ions for recycle purposes. These methods and the reaction mixture treatment method of this invention totally consume the added organic chemical compound prior to commencing the subsequent synthesis of the next batch of sodium dithionite. These methods also appear to destroy at least a portion of the thiosulfate ions. It consequently follows that the filtrate and/or the wash liquid produced by following the method of this invention can be employed in the cooling period or filtrate/wash liquid treatment methods of the prior art, by recycling these liquids as the methanol source for the next batch reaction or as the feed methanol for a continuous reaction, with reduced usage of an epoxy compound or a halogenated hydrocarbon for treating the filtrate and/or the wash liquid.

What is regarded as the invention and is desired to be protected is defined in the accompanying claims.

What is claimed is:

1. In the process for producing anhydrous dithionites which comprises supplying a plurality of feeds, comprising methanol, methyl formate, sulfurous acid anhydride, an alkali hydroxide, an alkali formate, and water, heating said feeds to reaction temperature within a reaction vessel and forming dithionite crystals in a mother liquor, filtering said dithionite crystals from the mother liquor, washing the dithionite crystals with an organic solvent as a washing liquid under conditions which do not cause a slurry to form, and drying the dithionite crystals;

the improvement comprising adding to said reaction vessel, at least one compound selected from the group consisting of the compounds represented by Formulas I and II; wherein Formula I is

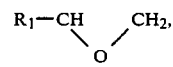

wherein $R_1$ is hydrogen, an alkyal group containing from 1 to 8 carbon atoms, a halogenated alkyl group containing from 1 to 2 carbon atoms, a phenyl group or a substituted phenyl group; and Formula II is

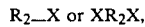

wherein $R_2$ is a primary or secondary alkyl group containing lrom 1 to 8 carbon atoms, an allyl group, or a 2-methylallyl or 2-ethylallyl group, and X is halogen, in an amount sufficient to provide an effective amount of said compound in said reaction vessel during said sodium dithionite producing process to convert said thiosulfate and other unidentified sulfur compounds, which form as by-products in the reaction, into substances which do not exert an adverse influence on the production of dithionites.

2. The process of claim 1, wherein said at least one compound is selected from the group consisting of ethylene oxide, propylene oxide, butylene oxide, isobutylene oxide, epichlorohydrin, epibromohydrin, styrene oxide, methyl iodide, allyl chloride, and cyclohexene oxide.

3. The process of claim 2, wherein said compound of Formula I is added in an amount of at least 1.8 weight % based on the sodium dithionite product.

4. The process of claim 2, wherein said compound of Formula I is propylene oxide.

5. The process of claim 4, wherein said propylene oxide is added in an amount of from 1.8–4.5 weight % based on the sodium dithionite product.

6. The process of claim 5, wherein said propylene oxide is introduced to said reaction vessel prior to starting the sodium dithionite producing process.

7. The process of claim 5, wherein said propylene oxide is introduced into said reaction vessel through the course of the entire reaction.

* * * * *